P. C. & L. J. LAWSON.
SIGNALING DEVICE FOR MOTOR VEHICLES.
APPLICATION FILED APR. 30, 1918.
1,296,093.
Patented Mar. 4, 1919.
2 SHEETS—SHEET 1.
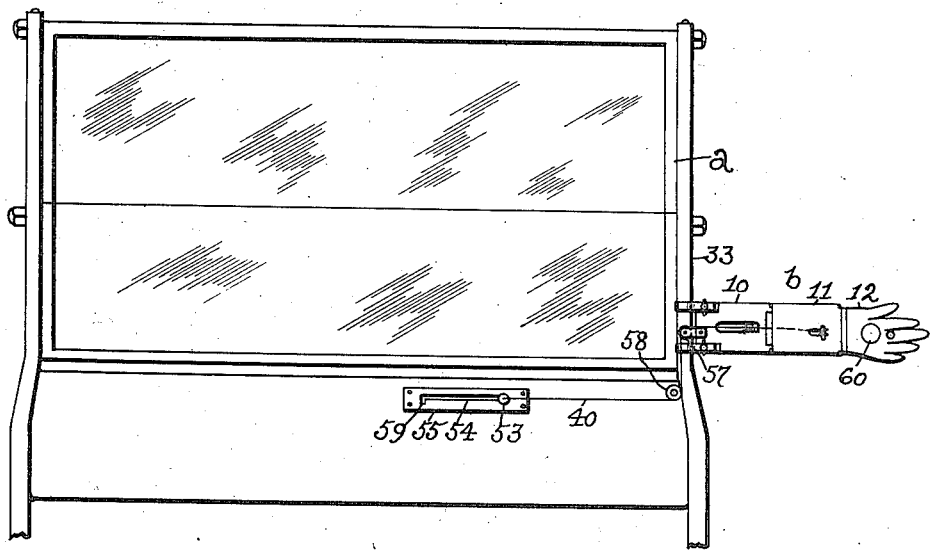
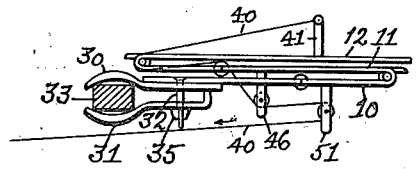
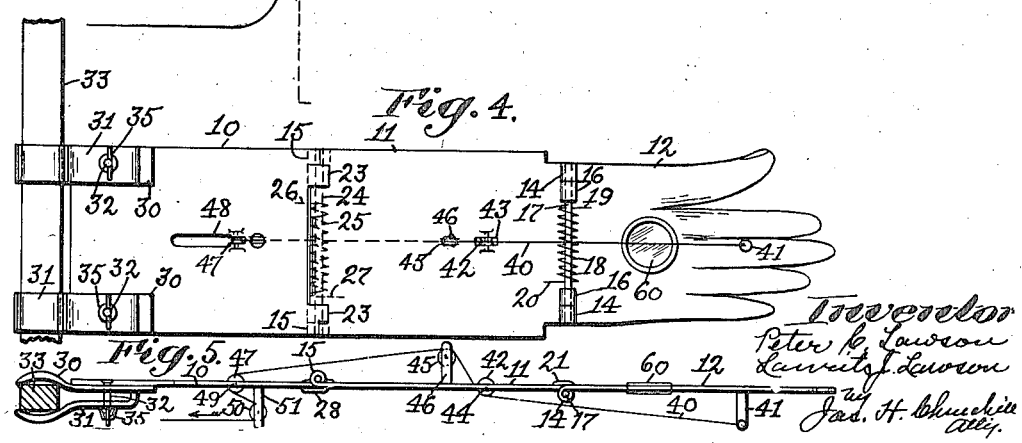

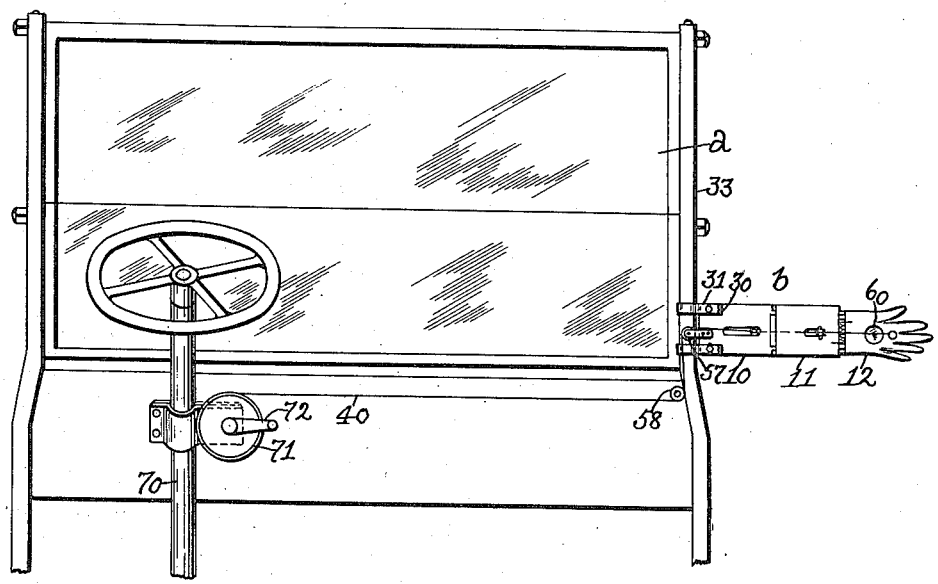
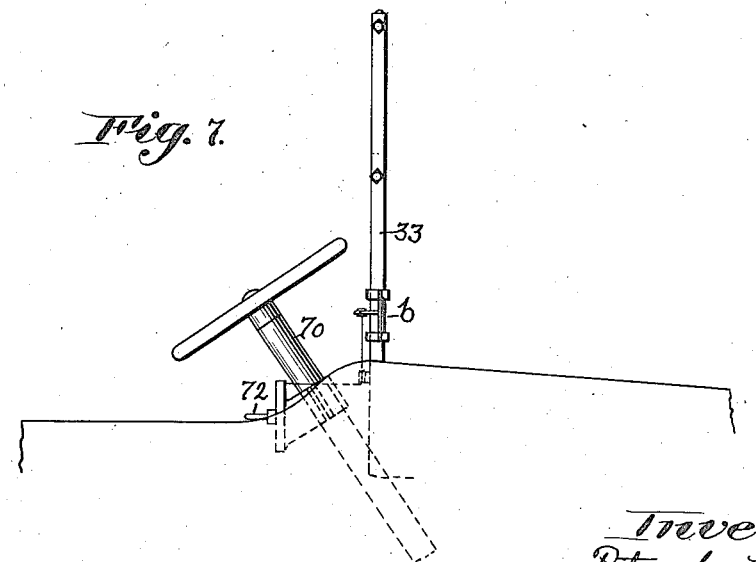

UNITED STATES PATENT OFFICE.

PETER C. LAWSON, OF BOSTON, AND LAURITS J. LAWSON, OF WOBURN, MASSACHUSETTS.

SIGNALING DEVICE FOR MOTOR-VEHICLES.

1,296,093.  Specification of Letters Patent.  Patented Mar. 4, 1919.

Application filed April 30, 1918. Serial No. 231,700.

*To all whom it may concern:*

Be it known that we, PETER C. LAWSON and LAURITS J. LAWSON, citizens of the United States, and residents of Boston and Woburn, in the counties of Suffolk and Middlesex, in the State of Massachusetts, respectively, have invented an Improvement in Signaling Devices for Motor-Vehicles, of which the following description, in connnection with the accompanying drawings, is a specification, like characters on the drawings representing like parts.

This invention relates to a signaling device for motor cars and like vehicles, and has for its object to provide a simple and efficient device for indicating that a change in the movement of the vehicle is about to be effected.

The invention further has for its object to provide a device of novel construction which is capable of assuming a compact form when not in use and of being extended beyond the side of the vehicle a substantial distance when in use.

Provision is made for attaching the device to the windshield and for operating manually the device as will be described.

These and other features of this invention will be pointed out in the claims at the end of this specification.

Figure 1 represents in elevation a portion of a motor vehicle provided with a signaling device embodying this invention.

Fig. 2, a side elevation of Fig. 1 looking toward the left.

Fig. 3, a plan of the device in its folded-up position, showing also the windshield frame in section.

Fig. 4, an enlarged elevation of the device in its extended or operative position.

Fig. 5, a plan of Fig. 4.

Fig. 6, an elevation like Fig. 1 showing the device as operated from the steering post, and Fig. 7, a side elevation of Fig. 6.

Referring to the drawings *a* represents the windshield of an automobile of known construction, and *b* a device for signaling a change in the movement of the automobile.

The signaling device *b* in accordance with this invention is composed of a plurality of members herein shown as three in number and marked 10, 11, 12, (see Figs. 4 and 5), which members are pivotally connected together so as to be capable of being moved into substantially the same plane when the device is in its operative position, and so as to be folded up and have the said members assume positions in substantially parallel planes (see Fig. 3) when not in use.

The member 12 may and preferably will be made in the form of a hand and is pivotally connected with one end of the member 11 so as to be turned back adjacent to and substantially parallel with one side or face of the member 11, and the latter is pivotally connected with the member 10 so as to be turned back with its opposite side or face adjacent to and substantially parallel with the member 10, as represented in Fig. 3.

To this end, the member 11 is provided at its opposite ends with hollow hubs or eyes 14, 15, which extend from opposite sides of the said member, and the hollow hubs or eyes 14 coöperate with like hubs or eyes 16 on the hand member 12 to receive a pintle or pivot pin 17, which is encircled by a helical spring 18 whose opposite ends 19, 20, bear against the members 12, 11, respectively, (see Fig. 4). The member 12 is provided with a lug or extension 21, which is designed to engage the member 11 on the side opposite to the lugs 14 and serves as a stop to limit the turning movement of the hand member 12 by the spring 18, when said hand member is in substantially the same plane as the member 11.

The hollow hubs or eyes 15 at the opposite end of the member 11 coöperate with lugs 23 on the member 10 to receive a pintle 24, which is encircled by a helical spring 25 whose opposite ends 26, 27 bear against the members 10, 11, respectively, and the member 11 is provided with a lug or extension 28 which coöperates with the member 10 and acts as a stop to limit the movement of the member 11 by the spring 25, when the member 11 is substantially in the same plane as the member 10. The member 10 is provided with means for attaching it to the automobile, and in the present instance, said member is provided with two sets of clamping members, each composed of members 30, 31, mounted on a threaded stud 32 secured to the member 10, and the members 30, 31, have their free ends extended beyond the rear end of the member 10 a sufficient distance to be engaged with a stationary upright 33 which supports the windshield $a$, and said clamping members 30, 31, are forced into fixed relation to said upright by a nut 35 which engages the threaded stud 32. Provision is made for operating the signaling device from the seat of the vehicle and from a position at a distance from the side of the vehicle on which the signaling device is located.

To this end, a cord, chain or like flexible device 40 is provided which has one end attached to a stud projecting from one face of the hand member 12, which face may be considered the rear face.

The cord 40 is passed over a pulley 42 extended through a slot 43 in the member 11 and mounted on a pin or shaft 44 supported by said member, and the cord 40 after being passed through the slot 43 is passed over a pulley 45 mounted on a stud 46 attached to the member 11 and projecting away from the front face thereof, and is then passed over a pulley 47 extended through a slot 48 in the member 10 and mounted on a pin or shaft 49 carried by the member 10.

The cord 40 is thus brought from in front of the member 10 to the rear thereof and is passed about a pulley 50 carried by a stud 51 extended from the rear face of the member 10. After the cord 40 has been carried about the pulley 50, its free end is located within access of the operator of the vehicle and may be retained in position to be easily and quickly grasped by the operator in any suitable manner. As represented in Fig. 1, the free end of the cord 40 is attached to a button 53 which is capable of sliding in a slot 54 in a plate 55 attached to the dasher 56 of the vehicle, said cord as shown in Fig. 1 being passed about pulleys 57, 58, located between the plate 55 and the pulley 50.

As represented in Fig. 1, the signal device is shown in its operative position in which it would indicate that the chauffeur was about to stop his car or to turn to the right. After the signal has been given, it can be folded up into the position indicated in Fig. 3, by the operator drawing on the cord 40, which may be effected by sliding the button 53 in the slotted plate 55 and the signal may be held in its folded-up position by engaging the button 53 with an angular extension 59 of the slot in said plate, or the free end of the cord may be otherwise secured.

By reference to Figs. 4 and 5, it will be seen that when strain is placed upon the cord 40, the member 12 will first be turned in one direction and folded against the rear side of the member 11, and then both members 12, 11, will be turned in the opposite direction and folded against the front face of the stationary member 10, as represented in Fig. 3, and when in this position, the device is compact, inconspicuous and does not detract from the appearance of the vehicle.

It will further be noticed that when the member 10 is clamped or otherwise attached to the vehicle, it becomes a stationary member, while the other members 11, 12 are pivoted members which are capable of being folded into a position substantially parallel with the stationary member, and as a result, the device when not in use is assembled into compact form and projects but little distance beyond the side of the vehicle. The hand member 12 may and preferably will be provided with a bull's-eye 60 of red glass, which at night is capable of being seen by the driver of a following car, when illuminated by the lights from an approaching car.

In Fig. 1, the flexible connection or cord 40 is represented as connected with a button on the dasher of the vehicle, but it is not desired to limit the invention in this respect, as it may be connected with a device carried by the steering post 70 as shown in Figs. 6 and 7, wherein the device is represented as a drum or pulley 71 capable of being turned by a crank 72.

When the member 11 is folded back against the member 10, the stud 46 passes through the slot 48 (see Fig. 3).

Claims:

1. A signaling device of the character described, comprising a member capable of being secured in fixed relation to a vehicle, a second member pivoted to the first-mentioned member to form an extension thereof in one position and to be folded back substantially parallel therewith in a second position, and a third member pivoted to the second-mentioned member to form an extension of the latter when in one position and to be folded back substantially parallel therewith in a second position, flexible means for turning the said second and third members into their folded positions, and means for automatically turning said second and third members into their extended position.

2. A signaling device of the character described, comprising a member capable of being secured in fixed relation to a vehicle, a second member pivoted at one end to said member to form an extension thereof in one position and to be turned in one direction to be folded back into a position substantially parallel with the first-mentioned member, a third member pivoted to the opposite end of the second member to form an extension thereof in one position and to be turned in a direction opposite to that in which the second member is turned to permit the third member to be folded back into a position substantially parallel with the second member, and means for folding and unfolding said pivoted members.

3. A signaling device of the character described, comprising a member provided with means for securing it in fixed relation to a vehicle, a second member pivoted to said first-mentioned member to form an extension thereof in one position and to be turned into another position substantially parallel with said first-mentioned member, a flexible connection for turning the pivoted member into its substantially parallel position, and a spring to turn it from said substantially parallel position into its position wherein it forms an extension of the first-mentioned member.

In testimony whereof, we have signed our names to this specification.

PETER C. LAWSON.
LAURITS J. LAWSON.